United States Patent [19]

Mialkowski

[11] Patent Number: 5,529,387
[45] Date of Patent: Jun. 25, 1996

[54] SOLENOID OPERATED DISCHARGING ORIFICE SHUTOFF VALVE

[75] Inventor: Waldemar Mialkowski, Somerville, N.J.

[73] Assignee: Valcor Engineering Corporation, Springfield, N.J.

[21] Appl. No.: 301,143

[22] Filed: Sep. 6, 1994

[51] Int. Cl.⁶ ................................................ F16K 31/06
[52] U.S. Cl. ............................ 251/30.03; 251/129.21
[58] Field of Search ........................... 251/30.03, 129.21; 137/613, 614.19

[56] References Cited

U.S. PATENT DOCUMENTS

| | | |
|---|---|---|
| 1,793,252 | 2/1931 | Roth . |
| 2,654,393 | 10/1953 | Ghormley . |
| 2,665,708 | 1/1954 | Ghormley ........................... 251/30.03 |
| 2,700,397 | 1/1955 | Compton ............................. 251/30.03 |
| 2,964,286 | 12/1960 | Hoskins . |
| 2,965,350 | 12/1960 | Knaebel et al. . |
| 2,969,088 | 1/1961 | Kramer ................................ 251/30.03 |
| 3,030,981 | 4/1962 | Chatham et al. . |
| 3,059,892 | 10/1962 | Windsor . |
| 3,103,337 | 9/1963 | Forte . |
| 3,114,532 | 12/1963 | Gray et al. .......................... 251/30.03 |
| 3,312,445 | 4/1967 | Trombatore et al. . |
| 3,540,462 | 11/1970 | Renzi . |
| 3,633,868 | 1/1972 | Catania ................................ 251/30.03 |
| 3,799,497 | 3/1974 | Zeuner . |
| 4,305,566 | 12/1981 | Grawunde . |
| 4,561,468 | 12/1985 | Kreitchman et al. . |
| 4,746,093 | 5/1988 | Scanderbeg . |
| 4,750,704 | 6/1988 | Brundage . |
| 4,848,721 | 7/1989 | Chudakov . |
| 4,925,252 | 5/1990 | Hee ..................................... 251/129.21 |
| 4,971,106 | 11/1990 | Tsutsui et al. . |
| 5,048,790 | 9/1991 | Wells . |
| 5,205,531 | 4/1993 | Kolchinsky . |

Primary Examiner—A. Michael Chambers
Attorney, Agent, or Firm—Darby & Darby

[57] ABSTRACT

A solenoid actuated valve of an in-line construction having an inlet and outlet between which are located the valve's operating components including a piston with a hollow head which engages a seat for sealing the valve's main flow path. The piston head has a discharging orifice which is sealed by the pilot pin of a solenoid operated poppet and a charging orifice through which high pressure fluid from the valve inlet is supplied. The poppet has flow passages downstream of the piston seat which communicate with the valve outlet. In a normally closed type valve, the solenoid is energized to move the poppet and withdraw its pilot pin from the piston head's discharging orifice and the high pressure inlet fluid admitted to the piston head interior through its charging orifice discharges through its now open discharge orifice at a faster rate than the fluid entering through the charging orifice to create a low pressure condition on the seating area of the piston and permit it to travel away from the seat and open the valve's flow path. In a normally open valve configuration, both the piston and poppet are biased away from seating and flow path sealing portions so that when the solenoid is operated the poppet is moved to a position where its pilot pin seals the piston discharging orifice and the fluid flow pressures within the valve body changes to move the piston to a flow path sealing position. The valve may also incorporate a dynamic flow limiter located at the valve's inlet to limit the fluid flow available to be supplied to the interior of the piston head.

13 Claims, 3 Drawing Sheets

SOLENOID OPERATED DISCHARGING ORIFICE SHUTOFF VALVE

BACKGROUND OF THE INVENTION

Solenoid operated shutoff valves are widely utilized in a variety of applications such as aerospace, scientific and commercial industries. Many types of such valves have shortcomings that limit improvements in their power consumption, operating time, weight, envelope package configuration and versatility. The use of typical pintel, poppet or pilot operated arrangements for solenoid operated valves requires relatively long strokes for valve actuation, i.e., opening or closing function. A long stroke length requires a relatively large solenoid, resulting in a larger envelope and increased weight and power consumption. A long stroke length also typically results in a long valve actuation time.

The internal arrangement of the components in conventional solenoid operated valves also mandates large fluid passageways to minimize fluid pressure drop. This contributes to larger valve envelopes and greater weights. Envelope requirements, typically directed to make the valve as small as possible, commonly imposed on conventional designs further complicate the addition of features such as pressure relief and flow limitation.

BRIEF DESCRIPTION OF THE INVENTION

The solenoid operated discharging orifice shutoff valve of the present invention is designed to minimize or eliminate the above-described problems. In accordance with the invention, charging and discharging orifices are used in the piston which seals the valve's flow path. The piston operates in conjunction with a special poppet which upon operation of the valve's solenoid assists in movement of the piston to open or close the flow path depending upon the valve being of the normally closed or normally open type. Further, the stroke of the solenoid operated poppet is greatly reduced, resulting in reducing actuation time and electric power drain.

The discharging orifice valve of the invention also reduces the size of internal components. This reduction lowers total unit weight, reduces total envelope size and allows for a relatively large fluid flow path, resulting in a low pressure drop for its small size. The valve's relatively small size simplifies the adaptation of various operating configurations such as: on/off, on/off/relief and on/off/flow limitation.

In accordance with the invention a solenoid actuated valve is provided of an in-line construction of inlet and outlet between which are located the valve's operating component. These include a piston with a hollow head which engages a seat for sealing the valve's main flow path. The piston head has a discharge orifice which is sealed by the pilot pin of a solenoid operated poppet and a charging orifice through which high pressure fluid from the valve inlet is supplied. The poppet has flow passages downstream of the piston seal which communicates with the valve outlet.

In operating the valve, for example if of the normally closed type, the solenoid is energized to move the poppet and withdraw its pilot pin from the piston head's discharge orifice. The poppet travels only a relatively short stroke to accomplish this. The high pressure inlet fluid admitted to the piston head interior through its charging orifice discharges through its discharge orifice at a faster rate than the charging fluid entering through the charging orifice. This creates a low pressure condition on the seating area of the piston and permits it to travel away from the seat and open the valve's flow path. In a normally open valve configuration, both the piston and poppet are biased away from seating and flow path sealing positions. When the solenoid is operated the poppet is moved to a position where its pilot pin seals the piston discharge opening and the fluid flow pressures within the valve body change to move the piston to a flow path sealing position.

In a preferred embodiment of the invention, a dynamic flow limiter is located at the valve's inlet and limits the fluid flow available to be supplied to the interior of the piston head.

The in-line construction of the valve components results in a small envelope size but is highly efficient in flow control with low power consumption.

OBJECTS OF THE INVENTION

It is therefore an object of the present invention to provide a flow control valve of relatively small size which operates with a small stroke of a poppet under control of a solenoid.

A further object is to provide a solenoid operated fluid flow control valve in which all of the valve components are positioned in-line within a valve body to minimize valve envelope size.

Yet another object is to provide a solenoid actuated fluid flow control valve with in-line components including a dynamic flow limiter.

An additional object is to provide a fluid flow control valve which is actuated by a solenoid to move a poppet to open or close a discharge orifice of a hollow piston to permit or block the flow of high pressure fluid admitted to the piston interior through a charging orifice to change the pressure relationship acting on the piston and permit its opening or closing relative to the valve main flow passage in a valve seat.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
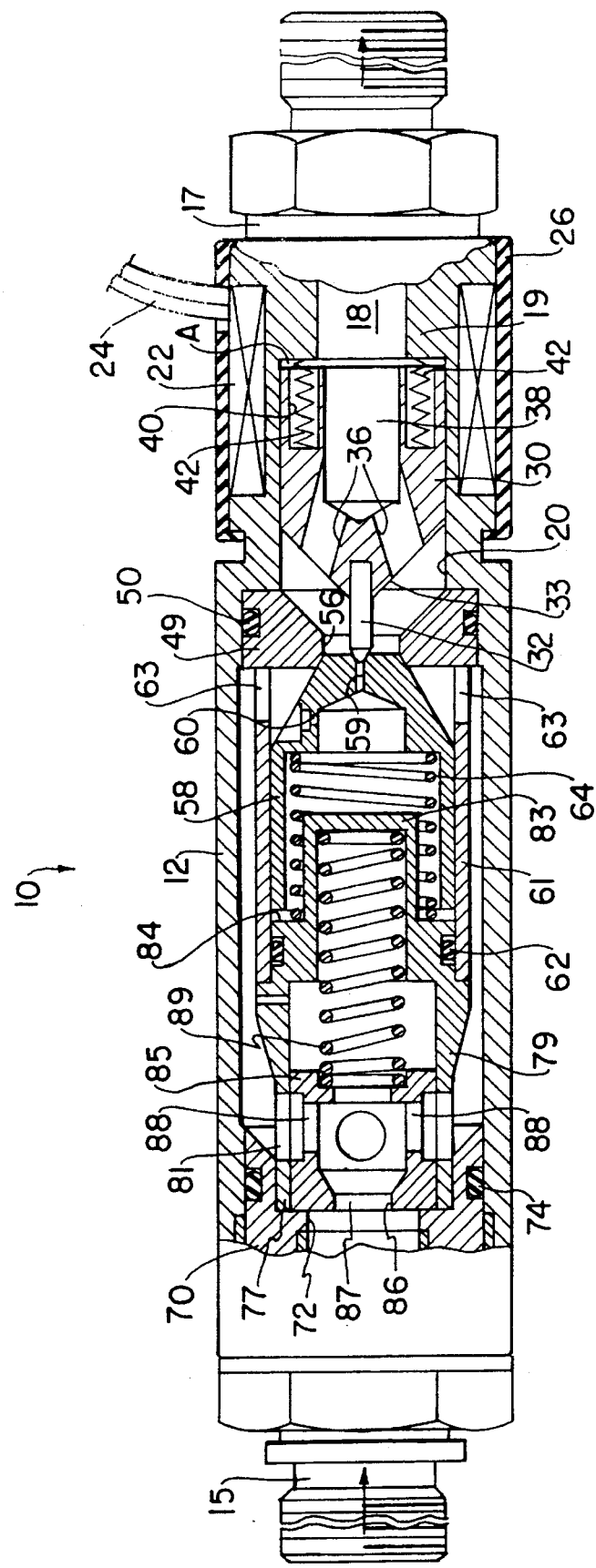
FIG. 1 is a cross-sectional view of a normally closed version of the valve, with flow limiter, in the closed position.

FIG. 1 shows a normally closed type version of the solenoid operated discharging orifice shutoff valve 10 of the invention in the static condition, i.e. without the application of electric power. Valve 10 has an outer tubular body 12 of any suitable material, usually metal, with conventional inlet and outlet fittings 15 and 17 integral at each end to which tubing (not shown) is to be connected to convey fluid to and away from the valve. The other valve components to be described, except for O-rings, are also of metal.

The external part of the body has a reduced diameter section adjacent the outlet end 17 in which a suitably electrically insulated solenoid coil 22 is located. Lead wires 24 for supplying current to coil 22 pass through a cover 26, preferably of electrically insulating material, which overlies the coil. The cover can be fastened to the body 12 by an adhesive, force fit, shrink fit, etc. The current source (not shown) for operating the valve can be of any suitable manual or automatic controlled type.

The body 12 has an internal reduced diameter section 20 adjacent the outlet end which terminates in a boss step 19. A flow passage 18 extends through the boss step 19 to the valve body outlet. A hollow poppet 30 slides within the body reduced diameter section 20. The poppet has a pilot pin 32 with a pointed end extending from a generally conical poppet head 33. The end of the poppet 30 remote from its head bottoms against the body boss step 19. The poppet 30 has a plurality of spaced flow passages 36 through its conical head 33 opening into a central poppet passage 38 which communicates with the valve outlet flow passage 18.

Popper 30 has an annular groove 40 at the end which faces step 19 within which a helical coil spring 42 is placed. Spring 42 biases the poppet 30 away from the step 19. The poppet is retracted toward the step 19 against the force of spring 42 when the solenoid coil 22 is energized. The poppet can travel the gap distance A between its end and the step 19 which distance, as shown, is relatively small as compared to the overall length of the valve body.

At the inlet end 15 of the valve an inlet housing 70 is mounted. Housing 70 has a central passage 72 which communicates with the valve inlet 15. Inlet housing 70 has an O-ring 74 at its end to engage the internal face of the valve body to prevent leakage. Fitted and sealed within an enlarged internal diameter end of inlet housing 70 is one end 77 of an elongated hollow inlet cap body 79 which extends toward the mid-part of the valve body 12. Inlet cap body 79 has a plurality of outlet orifices 81 formed around its end adjacent the inlet housing 70. The other end of inlet cap body 79 terminates in a cylindrical end cap 83 of external reduced diameter extending from a shoulder 84.

A dynamic flow limiter 85, to be described below, is slidably mounted within the inlet end of the inlet housing 70. Flow limiter 85 has a central flow passage 86 which is in-line with the inlet housing inlet passage 72. The limiter 85 has a plurality of radial outlets 88 around its circumference which lie opposed to the inlet cap body discharge orifices 81. The limiter also has a metering orifice inlet 87 communicating with the valve's inlet passage 72.

A helical spring 89 is positioned between the inner face of the end cap 83 and the face of the dynamic flow limiter 85 remote from the valve inlet. Under static conditions spring 89 biases the flow limiter toward the inlet to a position with its outlet passages 88 communicating with the inlet cap body discharge orifices 81.

An annular collar 49 sealed to the interior of body 12 by an O-ring 50 is fastened within the body against the end step of the reduced diameter section 20. Collar 49 has a flow orifice 56 into which from one side the poppet pilot pin 33 extends and on the other side provides a seat for the conical head of a hollow piston 58 which seals the flow passage 56. Piston 58 has a small diameter discharge orifice 59 through the center of its head to the piston interior body chamber. The piston body also has a radially extending charging orifice 60 through which high pressure inlet fluid can enter the piston interior body chamber.

The piston body slides within a bore tube 61 having one end abutting against the flow passage collar 49 and the other end fastened to the outside of shoulder 84 of the inlet cap body 79 with an O-ring 62 therebetween. Bore tube 61 has a plurality of discharge passages 63 around its circumference opposite the piston head. A helical spring 64 is located within the piston interior chamber with one end resting against the inside of the piston 58 and the other end on the inlet cap body shoulder 84. Spring 64 biases the piston head away from end cap shoulder 84 toward collar 49 to seal the flow opening 56. The piston 58 can travel the distance that the end of its body is urged away from the end cap shoulder 84.

The operation of the valve of FIG. 1 is described as follows. During static conditions, the normally closed valve is without electrical power. The magnetic field of the solenoid coil 22 is collapsed. The force of the piston spring 64 seats the conical head of the piston 58 against the seat of the collar 49 sealing off the flow orifice 56. With no electrical current applied to the solenoid, the poppet spring 43 drives the poppet 30 toward the piston 58 so that the pilot pin 32 enters and seals off the piston discharging orifice 59. In this condition, the valve is fully closed, preventing fluid flow through the valve, i.e., through the flow orifice 56. In this state, with no current applied to the solenoid, the valve behaves identically with or without the presence of a fluid at the inlet 15.

When fluid is supplied to the valve inlet with the solenoid 22 de-energized, the poppet 30 and its pilot pin 32 are still urged toward the piston head under influence of spring 42 so that the pilot pin 32 seats in and seals the piston discharge orifice 59. The piston interior chamber receives relatively high pressure inlet fluid through its charging orifice 60 with the fluid having traveled from the inlet 72, through the flow limiter 85, through passages 88 and 81, into the space between the body 12 interior and exterior of bore tube 61 and then through the bore tube passage 63 into to the space between the bore tube and the piston. The fluid then passes through the piston's charging orifice 60 and into its interior chamber where it is present to act on the poppet pilot pin 32. The inlet fluid is also present around the exterior periphery of the piston head upstream of the seat 49.

When the solenoid 22 is activated it moves the poppet by the gap distance A and thereby moves the pilot pin 32 away from the discharging orifice 59 to the open position. The fluid pressure exiting from the piston discharging orifice 59 acts on the pilot pin 32 to aid the separation force produced by the solenoid in moving the pilot pin away from the piston discharging orifice 59. The fluid in the bore tube 61 aids in moving the piston head 58 away from the seat 49.

Figure 2:
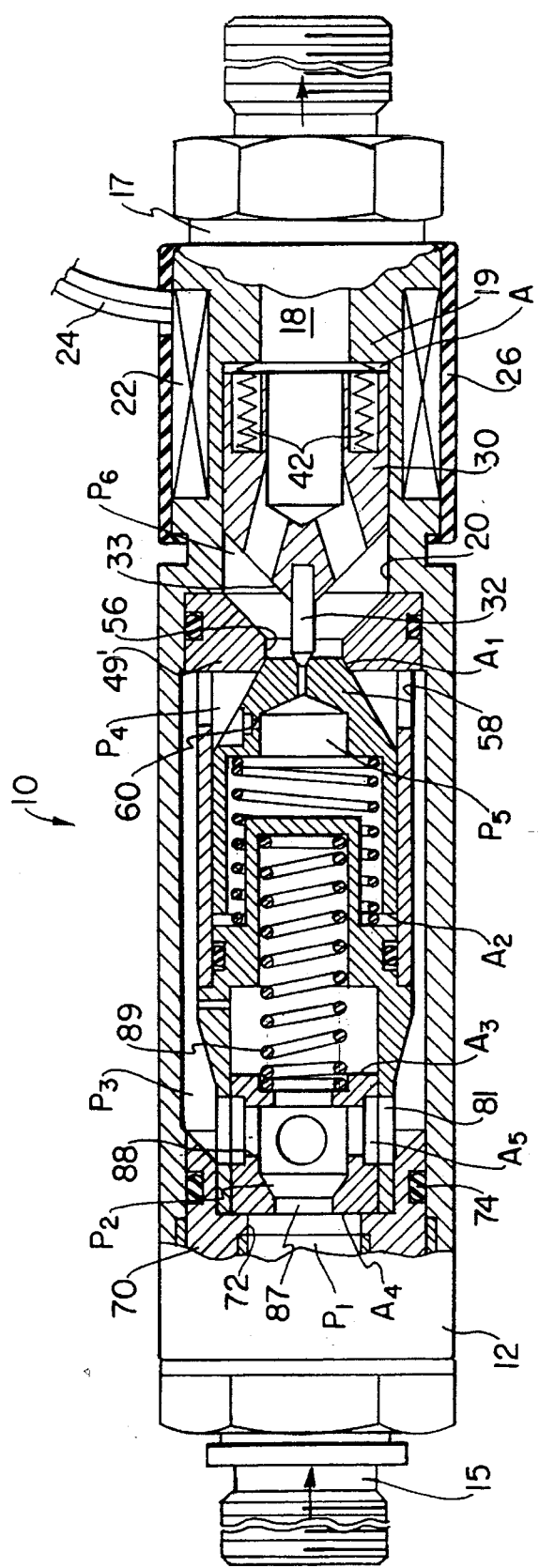
FIG. 2 is the same view as FIG. 1 showing pressure and area relationships of the valve.

FIG. 2 is the same view as FIG. 1 but pressure (P) and area (A) designations have been added to various locations of the valve to explain its operation. In its fully closed position with the solenoid de-energized and inlet fluid at inlet pressure $P_1$, all upstream pressures are equal: $P_1=P_2=P_3=P_4=P_5=P_6$. In this case, the piston 58 receives further aid to close against the seat of the collar seat 49 by the additional force of pressure $P_5$, entering the piston interior chamber through the charging orifice 60, acting on the Area $A_2$, which is the end of the piston spaced from the inlet cap body shoulder 84. This force is greater than the force of pressure $P_3$ acting on the area $A_2$ minus the area of $A_1$ (note: $P_5=P_3$; $A_2>A_1$). The force of the piston 58 against the seat of collar 49 induced by the addition of the fluid pressure further enhances the low leakage characteristics of the valve design.

The solenoid coil 22 is energized to open the valve and a magnetic field is generated which retracts the poppet 30, opposing the force of the poppet spring 45, and moves the pilot pin 32 to open the piston discharging orifice 59. At this moment, pressure $P_5$, within the piston interior chamber, drops to a level that balances the pressure at the discharging orifice 59, $P_4$. The drop in $P_5$ pressure causes the piston 58 to retract away from the seat 50, compressing the piston spring 64. The piston 58 retracts because the original relationship of $P_5 \times A_2 > P_3 \times A_2 - A_1$ has now changed to $P_5 \times A_2 < P_3 \times A_2$.

The separation of the poppet pilot pin 32 from the piston 58 initiates flow through the piston's discharging orifice 59 at a very high pressure differential relative to the pressure $P_6$ downstream of the seat 49. Prior to opening the piston discharging orifice 59 pressures at the charging 60 and discharging 59 orifices were balanced (i.e. $P_4 = P_6$). Once the discharging orifice 59 begins to open, the large pressure differential generates a large opening force on the piston 58. The combination of the small stroke requirement of the poppet 30 to open the piston discharging orifice 59 and the large dynamic forces acting to open the piston 58 by the inlet pressure result in very fast response times. The small stroke and fast response time reduce electrical current draw, valve envelope and mass.

Once the piston 58 has unseated from the seat 49, fluid flows from the inlet fitting 15 through the flow limiter 85, through the flow limiter and inlet cap body passages 88 and 81 into the cavity formed by the inner surface of the valve body 12 and the outside diameter of the cylindrical portion of the bore tube 61 around the piston head and through the now open seat 49 into the flow cavity upstream of the poppet 30, through the passages 36 in the poppet 30 and out the outlet fitting 19.

When valve closure is desired, electrical current is removed from the solenoid coil 22, collapsing the magnetic field. The force from the poppet spring 42 drives the poppet 30 back towards the piston 58 and the pilot pin enters and closes the discharging orifice 59. At this time, piston pressure $P_5$ increases to balance with inlet pressure $P_3$ and, in turn, $P_5 \times A_2 > P_3 \times A_2 - A_1$ causing the piston 58 to close against the seat 49 and shuts off fluid flow.

The operation of the flow limiter 85 is now described with respect to FIG. 2. In static state/balanced state conditions, the inlet pressure $P_1$ multiplied by the area $A_3$ of the limiter end equals the metered pressure $P_2$ at the limiter's metering orifice 87 multiplied by the same area $A_3$ plus the force ($F_{89}$) of the flow limiter spring 89 (i.e. $P_1 \times A_3 = (P_2 \times A_3) + F_{(89)}$) due to the pressure differential across the metering orifice 87. During unbalanced conditions, inlet pressure $P_1$ increases, overcoming the force of the flow limiter spring 89 plus the pressure/area force of $P_2 \times A_3$ and begins closing the flow limiter 85, moving it away from inlet housing 70 and compressing the flow limiter spring 89. Movement of the flow limiter 85 in the direction of compressing spring 89 reduces the effective area of the outlet orifice area ($A_5$) since this area is a result of the total amount of overlap between the flow limiter outlet passages 88 and the inlet cap body passages 81. Movement of the flow limiter 85 continues until a balanced condition is met (i.e. where $P_1 \times A_3 = (P_2 \times A_3) + F_{(89)}$). The flow limiter 85 attempts to maintain a constant pressure differential through its metering orifice 87 and, thus, constant flow. A key feature of the solenoid operated discharging orifice valve is the integration of the flow limiter into the valve body and flow path. The valve of the invention allows for a very compact, integrated design.

The valve design allows for the incorporation of the adjustable flow limiter. Rather than maintaining a fixed metering orifice 87 in the flow limiter 85 a threaded device can be added to allow for adjustment of the metering orifice diameter and thus, adjustment of the flow. The discharging orifice valve may also be configured without a flow limiter.

An additional feature of the discharging orifice design is the inherent pressure relief function. In steady conditions with no electrical current applied to the solenoid coil 22 the pressure relationships in the valve are: $P_1 = P_2 = P_3 = P_4 = P_5 > P_6$ When piston pressures, $P_5$ and $P_6$, exceed a preset limit (which is a function of the force of the spring 42 acting on the poppet 30), the fluid pressure opens the poppet 30, opening the piston discharging orifice 59. At this time, the piston 58 opens momentarily until a balanced state exists between the pressures acting on the piston 58 and the poppet 30 and spring 42. Once the excess pressure is relieved, the piston 58 and poppet 30 return to their normally closed steady state position.

An inherent advantage of the solenoid operated discharging orifice shutoff valve is its versatility for incorporating many valve design features without major changes to its baseline configuration.

Figure 3:
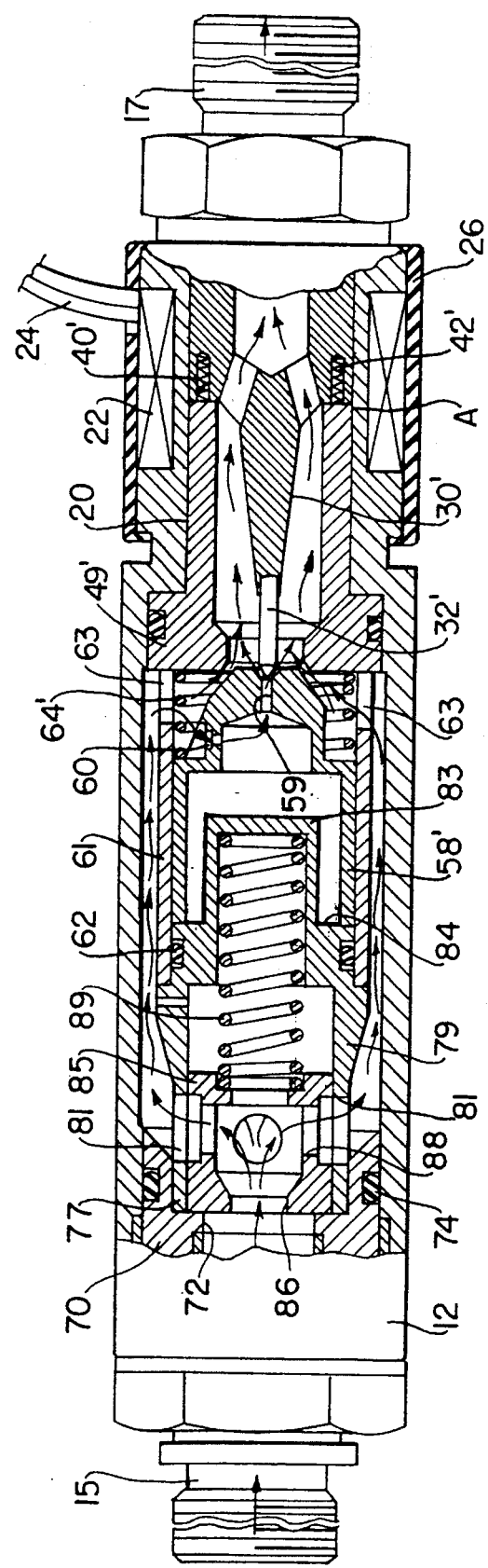
FIG. 3 is a cross-sectional view of a normally open version of the valve with a flow limiter.

The valve described above is of the normally closed type. The discharging orifice valve can also be configured for a normally open version. This is described in FIG. 3 where the components already described are designated with the same reference numerals and different parts are described. FIG. 3 also shows the fluid flow path for the normally open valve. In the valve of FIG. 3 the poppet 30' has more tapered shape.

The normally open version has the positions of the poppet 30' and its spring 42', and the piston 58' and piston spring 64' reversed compared to the configuration shown in FIG. 1. The seat collar 49' extends into the reduced diameter body section 20 toward the outlet and a spring 42' is located in a groove 40' in the poppet body. Spring 42' acts against the collar 49' extension to bias the poppet away from the flow passage 56 seat. The piston spring 64' acts between a shoulder 56a on the piston body and the collar 49 to bias the piston away from the valve seat to open the flow passage. The fluid flow is shown by the flow lines.

During the static condition, with the solenoid de-energized, the spring force of the piston spring 64' unseats the piston 56 from the seat 49 driving the end of piston 56 against the inlet cap shoulder 84. With no electrical current applied the poppet spring 42' drives the poppet 30' and its associated pilot pin 32' away from the piston discharge orifice 59 seating the poppet against the end of the bore in the valve body 12 near the outlet fitting 17. In this condition, the valve is fully open, allowing fluid flow through the valve (i.e. through the flow orifice 56). As in the normally closed configuration of FIG. 1, the fluid pressure $P_3$ acting on the face of the piston 56 counteracts the force of the piston pressure $P_5$ acting on the area $A_2$ (i.e. $P_3 \times A_2 > P_5 \times A_2$).

To close the valve, electrical power is applied to the solenoid coil 22. The magnetic field generated pushes the poppet 30' against the force of the spring 42' and the pilot pin 32' closes the piston discharging orifice 59. At this time, piston pressure $P_5$ increases to balance with inlet pressure $P_3$ and, in turn, $P_5 \times A_2 > P_3 \times A_2 - A_1$ causing the piston 56 to move against the force of spring 64' against the seat 49 to shut off fluid flow.

The discharging orifice valve may also be configured as a latching solenoid design. Rather than a single solenoid, open and close solenoids and a latching mechanism are incorporated into the valve body.

The discharging orifice valve may be configured in any size to handle a variety of fluid flow requirements. The valve design can be enlarged or reduced simply by resizing the component dimensions. A number of different types of inlet and outlet fittings and electrical connection means may be used with the valve such as, standard pipe threads, tube ends, MS flare fittings, MS flareless fittings, lead wires, MS electrical connector, etc.

The valve is capable of handling virtually all fluids, whether gaseous or liquid. The materials of the valve would be selected to maintain compatibility with the fluid.

What is claimed is:

1. A solenoid operated orifice shut-off valve comprising:

a linear generally tabular body having an inlet and an outlet for fluid;

a valve seat within said body forming a flow passage for passage of fluid from the valve inlet to the valve outlet;

a hollow piston having a head for engaging the upstream side of said valve seat to open and close said flow passage, said piston having a charging orifice to receive in its interior the fluid from the inlet at a relatively high pressure and a discharge orifice in the piston head facing the valve seat flow passage;

a poppet downstream of the valve seat having a pilot pin for sealing said piston head discharge orifice;

first means exerting a force for biasing said piston in a direction away from a seating position to seal said flow passage;

second means exerting a force for biasing said poppet to move its pilot pin in a direction away from said piston head discharge orifice;

solenoid means to produce upon actuation a force to move said poppet along the length of the valve body against the force produced by said second means in a direction to move said pilot pin into sealing engagement with said piston discharge orifice, the interior of said piston receiving fluid through said charging orifice to produce a force to move said piston against the force of said first means toward said seat to seal said flow passage.

2. A valve as in claim 1, wherein said poppet has flow passages therethrough to receive fluid from said valve seat flow passage and communicate with the valve outlet.

3. A valve as in claim 1, further comprising a hollow valve inlet body housing spaced from the valve body internal wall and having a central passage in line with the valve inlet to receive inlet fluid, and a flow limiter body slidable within said valve cap body for controlling the amount of fluid to be supplied to said piston and the upstream side of the valve seat.

4. A valve as in claim 3, wherein said flow limiter further comprises passages formed in said inlet housing body and in said flow limiter body which are covered and uncovered with respect to each other on said flow limiter body slides within said inlet body housing.

5. A valve as in claim 4, wherein said flow limiter body has an inlet orifice in communication with the valve inlet which controls the amount of fluid entering the flow limiter body and flowing to said piston.

6. A valve as in claim 4, wherein said flow limiter body has an inlet orifice in communication with the valve inlet which controls the amount of fluid entering the flow limiter body and exiting through said passages of said flow limiter and said inlet body housing.

7. A solenoid operated orifice shut-off valve comprising:

a linear generally tubular body having an inlet and an outlet for fluid;

a valve seat within said body forming a flow passage for passage of fluid from the valve inlet to the valve outlet;

a hollow piston having a head for engaging the upstream side of said valve seat to open and close said flow passage, said piston having a charging orifice to receive in its interior the fluid from the inlet at a relatively high pressure and a discharge orifice in the piston head facing the valve seat flow passage;

a poppet downstream of the valve seat having a pilot pin for sealing said piston head discharge orifice;

first means exerting a force for biasing said piston in a direction to seal said flow passage;

second means exerting a force for biasing said poppet in a direction to seat its pilot pin in said piston head discharge orifice;

solenoid means to produce upon actuation a force to move said poppet along the length of the valve body against the force produced by said second means in a direction to move said pilot pin out of sealing engagement with said piston discharge orifice;

said piston discharge orifice dimensioned relative to said charging orifice to discharge fluid from the interior of the piston upon movement of said pilot pin away from said discharge orifice at a faster rate than fluid enters said charging orifice to reduce the fluid pressure differential between the piston interior and the piston head at the seat to move the piston against the force produced by said first means to unseat it from said seat.

8. A valve as in claim 7, wherein said poppet has flow passages therethrough to receive fluid from said valve seat flow passage and communicate with the valve outlet.

9. A valve as in claim 7 further comprising a tube spaced from the interior of the body in which said piston slides, said tube having a passage to receive fluid from the inlet flowing between the interior of the body and the tube to be present at said piston charging orifice and around the exterior of the piston head.

10. A valve as in claim 7, further comprising a hollow valve inlet body housing spaced from the valve body internal wall and having a central passage in line with the valve inlet to receive inlet fluid, and a flow limiter body slidable within said valve cap body for controlling the amount of fluid to be supplied to said piston and the upstream side of said valve seat.

11. A valve as in claim 10, wherein said flow limiter further comprises passages formed in said inlet housing body and in said flow limiter body which are covered and uncovered with respect to each other as said flow limiter body slides within said inlet body housing in response to changes in inlet fluid pressure.

12. A valve as in claim 10, wherein said flow limiter body has an inlet orifice in communication with the valve inlet which controls the amount of fluid entering the flow limiter body and flowing to said piston.

13. A valve as in claim 11, wherein said flow limiter body has an inlet orifice in communication with the valve inlet which controls the amount of fluid entering the flow limiter body and exiting through said passages of said flow limiter and said inlet body housing.

* * * * *